July 7, 1925.
L. H. SMITH
FORD FENDER BRACE
Filed March 10, 1923
1,544,781
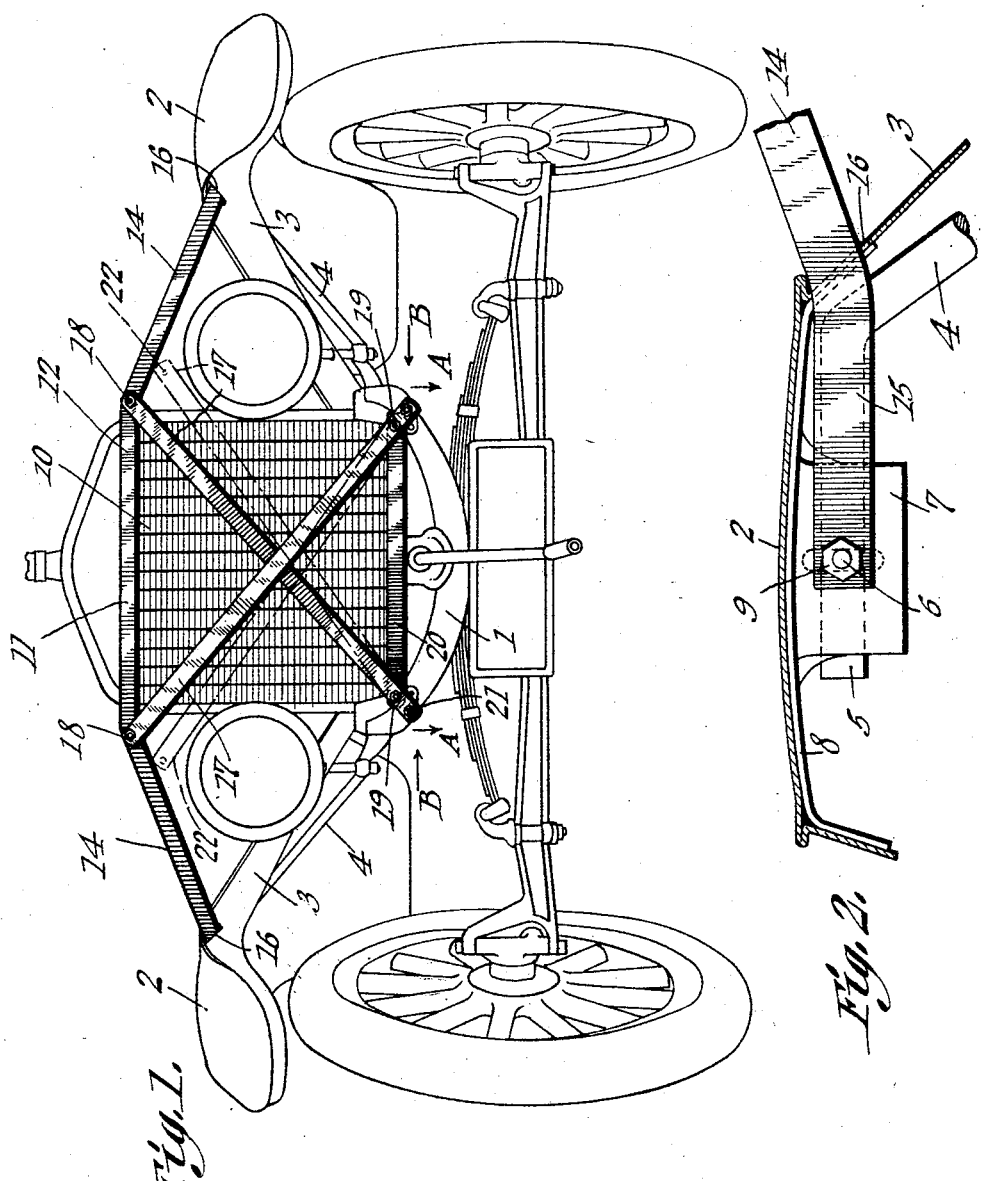
L. H. Smith
Inventor Patented July 7, 1925.

1,544,781

UNITED STATES PATENT OFFICE.

LLOYD HUDSON SMITH, OF WACO, TEXAS, ASSIGNOR TO WONDER TRAP CO., INC., OF WACO, TEXAS.

FORD FENDER BRACE.

Application filed March 10, 1923. Serial No. 624,145.

*To all whom it may concern:*

Be it known that I, LLOYD HUDSON SMITH, a citizen of the United States, residing at Waco, in the county of McLennan and State of Texas, have invented a new and useful Ford Fender Brace, of which the following is a specification.

One object of this invention is to provide novel means for bracing the fenders of an automobile, without working changes in the standard construction of the vehicle. Another object of the invention is to provide a device of the class hereinafter described, which will exercise a two-fold office, in that it will not only sustain the fenders of a vehicle, but, as well, prevent the curved front frame member of the vehicle from straightening out.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:—

Figure 1 shows in elevation, a device constructed in accordance with the invention, mounted on a Ford automobile, portions of which appear in elevation, and portions of which appear in perspective; Figure 2 is a fragmental transverse section showing the means whereby the upper member of the bracing mechanism is assembled with the fender.

The numeral 1 marks the curved front cross member of the frame of a Ford automobile, the forward fenders being designated by the numeral 2 and including inwardly and downwardly inclined wings 3. Braces 4 are connected at their lower ends to the frame member 1 and have outwardly projecting ends 5 held by securing elements 6, such as eye-bolts, on lugs 7 carried by reinforcing strips 8 extended transversely of the fenders 2, nuts 9 being threaded on the eye-bolts 6. The radiator is marked by the numeral 10. The structure above described constitutes a part of the standard construction of an automobile, and no novelty is claimed for it, saving in so far as it may enter into combination with parts hereinafter described.

In carrying out the invention, there is provided a top bar 11, which is rigid, the top bar including an intermediate portion 12 disposed horizontally in front of the radiator 10, the top bar comprising downwardly inclined and outwardly extended arms 14 projecting through openings 16 in the wings 3 of the fenders 2, the arms having approximately horizontal ends 15 mounted on the shanks of the eye-bolts 6 and held against the lugs 7 by the nuts 9, as shown in Figure 2. Crossed elements 17, in the form of rigid braces, are provided, and these crossed elements, owing to a function which they possess, as hereinafter described, may be alluded to as levers. Securing members 18, such as bolts, connect the upper ends of the crossed members 17 with the top bar 11. A bottom bar or fulcrum member 20 which is rigid, is located slightly above the lower ends of the crossed elements 17 and is connected thereto by securing devices 19, the elements 17 thus being fulcrumed, intermediate their ends, on the bar 20. Securing elements 21 connect the lower ends of the crossed levers 17 with the curved front frame member 1.

Considering the device as it stands in solid line in Figure 1, it will be obvious that an effective and adequate support and brace for the fenders 2 is provided, no changes being made in the standard construction, and the eye-bolts 6 serving as a means for connecting the outer ends of the top bar 11 to the fenders 2.

The device has added utility, over and above that already outlined, and in this connection, attention is directed to the fact that the curved frame member 1 tends to straighten out, the ends of the said member sagging downwardly in the direction of the arrows A in Figure 1. Before the top bar 11 is connected at 18 to the crossed members 17, they stand about in the position indicated in dotted line at 22. The members 17 are swung toward each other at their upper ends, and are joined at 18 to the top bar 11, the members 17, during this movement, acting as levers, fulcrumed at 19 on the bar 20 and tending to exert inward pressure on the member 1, in the direction of the arrows B, in Figure 1.

It is clear that when all parts are joined up as shown in Figure 1, there is provided a strongly constructed brace or truss which prevents the ends of the frame member 1 from sagging downwardly in the direction of the arrows A and producing a looseness of parts which generally results in an undesirable rattling.

What is claimed is:—

The combination with the curved front frame member of a vehicle, of levers crossed upon each other and connected at their lower ends to the frame member at points adjacent to the ends of the frame member, a lower bar whereon the levers are fulcrumed, intermediate their ends, and below their point of crossing, and an upper member of rigid form connected detachably to the upper ends of the cross levers.

In testimony that I claim the foregoing as my own, I have hereto affixed my signature in the presence of two witnesses.

LLOYD HUDSON SMITH.

Witnesses:
   FULDA L. SEARCH,
   MASON B. LAWTON.